United States Patent Office.

BENJAMIN W. DONALDSON, OF DIXFIELD, MAINE.

*Letters Patent No. 76,308, dated April 7, 1868.*

IMPROVED MEDICINE.

*The Schedule referred to in these Letters Patent and making part of the same.*

TO ALL WHOM IT MAY CONCERN:

Be it known that I, BENJAMIN W. DONALDSON, of Dixfield, in the county Oxford, and State of Maine, have invented a new and useful Improvement in Medicines; and I do hereby declare that the following is a full and exact description thereof.

My compound of medicine is intended for the cure of consumption and other affections of the lungs, and has been found successful in my own case, and also in many cases of my friends who have used the same as matter of experiment.

I propose to call my medicine "The Consumptive-Balsam," and I prepare it substantially in the following manner: For a small quantity of my compound, take a quarter of a pound of the buds of the balm-of-Gilead tree, and soak the same in a mixture of a pint of whiskey with a pint of water, during twelve hours. Then steep, but not boil, for one hour; then add half a pint of molasses, and steep another hour. Now strain, and put in a stoppered bottle, for use.

This medicine should be taken four times a day, say one hour before each meal, and also before going to bed. Smaller dose for children.

The balm-of-Gilead buds may be gathered in the fall, winter, or early spring, and should be used while fresh.

The proportions of the ingredients may be somewhat varied without departing from my invention, and other ingredients may also be added without destroying the effect of the medicine.

Having thus fully described my invention, what I claim, and desire to secure by Letters Patent of the United States, is—

The above-described compound of medicine, prepared substantially in the manner set forth.

BENJ. W. DONALDSON,

Witnesses:
 DANIEL BREED,
 AUSTIN B. PAIGE.